May 27, 1958 R. B. DOME 2,836,716
ANGLE MODULATION DETECTOR
Filed Sept. 23, 1953 2 Sheets-Sheet 1
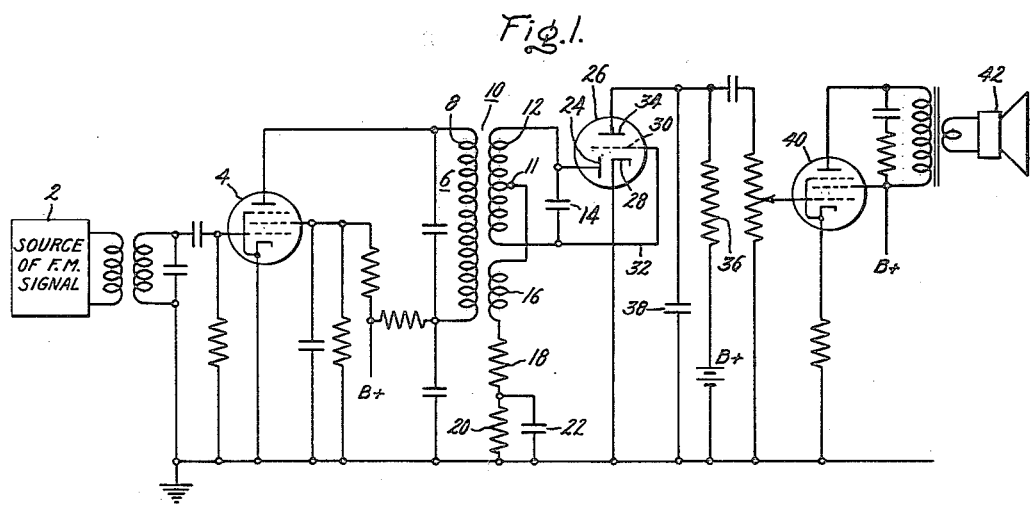
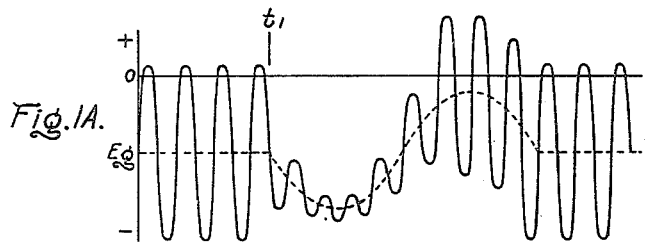
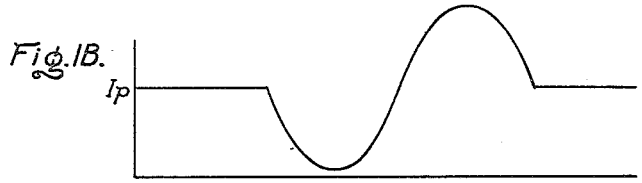
Inventor:
Robert B. Dome,
by Donald N. Timbie
His Attorney.

May 27, 1958 — R. B. DOME — 2,836,716
ANGLE MODULATION DETECTOR

Filed Sept. 23, 1953 — 2 Sheets-Sheet 2

Inventor:
Robert B. Dome,
by [signature]
His Attorney.

United States Patent Office 2,836,716
Patented May 27, 1958

2,836,716

ANGLE MODULATION DETECTOR

Robert B. Dome, Geddes Township, Onondaga County, N. Y., assignor to General Electric Company, a corporation of New York Application September 23, 1953, Serial No. 381,882

2 Claims. (Cl. 250—27)

This invention relates to means for recovering the intelligence signal conveyed by an angle modulation of a carrier wave and in particular, though not limited thereto, to means for recovering the intelligence signal conveyed by frequency modulation of a carrier wave.

Previous detectors for recovering signals conveyed by the various forms of angle modulation of a carrier wave have required considerable resistance between the cathode of at least one of the rectifiers and ground. This makes the use of such detectors impractical in battery-operated receivers having tubes with filaments that also serve as cathodes because the resistance consumes too much power and because the filament current flowing through the resistance would act as an undesirable bias for the detector.

Therefore, in accordance with an object of this invention, a detector for angle modulated waves is provided wherein the cathodes of both rectifiers may be returned to a common potential which may, if desired, be ground.

It is an object of the present invention to provide an angle modulation detector in which the cathodes of both rectifiers are grounded and which rejects amplitude modulations that may be present. Hence the detector of the invention provides what may be termed balanced detection.

Another object of the invention is to provide an angle modulation detector that is relatively free from the effects of noise and in which the cathodes of the rectifiers involved may be returned to the same potential.

A further object of the invention is to provide an angle modulation detector that is less expensive to manufacture.

Still another object of this invention is to provide an angle modulation detector that uses a low-priced diode triode in such manner that the common cathode of all the sections of the tube may be returned to ground or some other reference potential.

Briefly, a way of attaining these objects in accordance with the principles of this invention may be explained as follows: The angle modulation detector of this invention is actually comprised of two different types of amplitude detectors, one being a diode rectifier and the other being an amplifier operated as a plate power detector. Means such as a discriminator transformer are provided for applying the carrier wave to the diode and to the amplifier. This is done in such way that a deviation of carrier frequency in one direction from its central value causes a proportional increase in the negative output of the diode rectifier. The diode rectifier output is applied so as to reduce the current flowing in the power detector amplifier anode circuit. At the same time the discriminator transformer is coupled to the plate power detector amplifier in such a way as to cause an increase in the average plate current as the carrier frequency deviates in the opposite direction. When the carrier is at its central frequency, these two effects are balanced for a limited range of carrier amplitudes. However, when the carrier wave is angle modulated in accordance with an audio signal, the average plate current increases and decreases in accordance with the audio signal.

The manner in which the objects noted above, as well as other advantages of the invention may be attained, will be better understood after the following detailed discussion taken in conjunction with the accompanying drawings in which:

Figure 1 is a schematic diagram of one embodiment of the invention;

Figure 1A is a graph showing the voltage applied to a control electrode of the plate power detector;

Figure 1B is a graph showing the corresponding variation in the plate current of the plate power detector;

Figure 2:
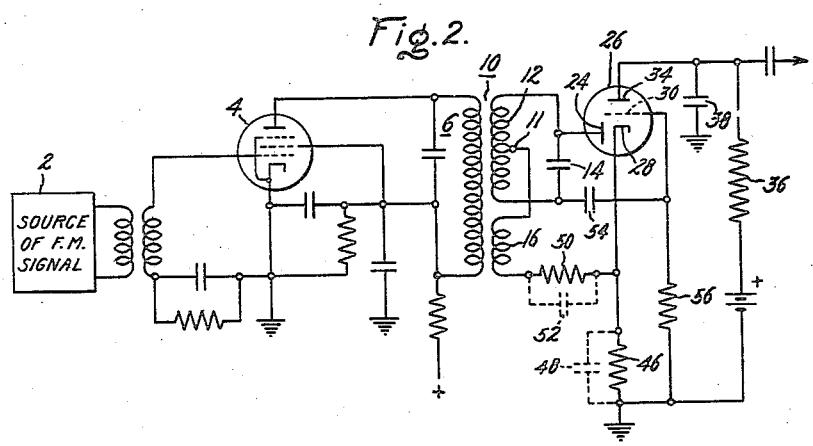
Figure 3:
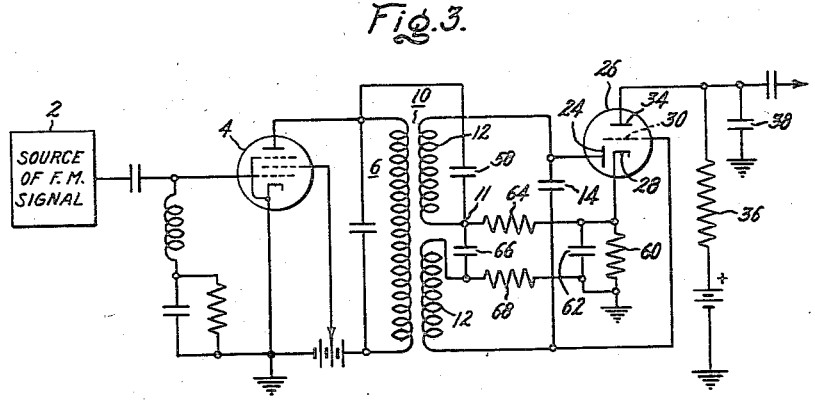

Figure 2 is a schematic diagram of another embodiment of the invention wherein the common cathodes of the diode and the plate power detector amplifier are operated above ground potential; and Figure 3 is a schematic diagram of an embodiment of the invention wherein the common cathode is operated above ground potential and the coupling to the intermediate point of the secondary of the discriminator transformer is effected by a condenser rather than by a tertiary winding.

In Figure 1, an angle modulated intermediate frequency carrier wave, herein indicated as being an FM wave, is supplied by a source 2 and is coupled to an amplifier 4 that functions in a well known manner to maintain the amplitude of the carrier wave oscillation appearing in the tank circuit 6 within relatively narrow limits. The inductive branch 8 of the tank circuit 6 serves as the primary of a discriminator transformer 10. A secondary winding 12 of the transformer 10 is tuned to resonance at the central carrier frequency by a shunt condenser 14. A carrier wave corresponding to that appearing at the plate of the limiting amplifier 4 is coupled to an intermediate point 11 of the secondary winding 12 by a tertiary winding 16. One end of the winding 16 is connected to the intermediate point 11 and the other is connected to a point of reference potential, here shown as ground, via series resistors 18 and 20. A condenser 22 bypasses carrier frequencies around the resistor 20. However, the time constant of the resistor 20 and the bypass condenser 22 is such that they present an impedance that is essentially resistive for audio frequencies.

With the transformer connection just described, it will be apparent to one skilled in the art that as the carrier wave frequency deviates about its central value in accordance with an audio intelligence, the amplitude of the carrier wave between either extremity of secondary 12 and the reference potential varies in a similar manner. However, these variations in carrier amplitude are 180° out of phase so that when one decreases the other increases.

The audio variations in the amplitude of the carrier wave appearing between ground and the extremity of the secondary 12 lying above the tap 11 are detected in such manner as to appear across the resistor 20 by connecting the plate 24 of the diode section of a diode triode tube 26 to the upper end of the winding 12 and grounding the common cathode 28. The variations in the amplitude of the carrier wave appearing between ground and the extremity of the secondary winding 12 below the tap 11 are superimposed on the audio voltage appearing across the resistor 20, and the resultant voltage wave is applied to the grid 30 of the triode section of the tube 26 via a lead 32. The plate 34 of the triode section is connected to B+ via a load resistor 36. A condenser 38 bypasses any carrier frequencies to ground. Because of the large amount of gain in the angle modulation detector just described, the plate 34 of the triode may be coupled directly to the input of an audio power amplifier 40 thus eliminating the usual intermediate amplifier. The output of the power amplifier 40 drives a speaker 42 in the usual manner.

The operation of the angle modulation detector is as follows: Assume that the frequency of the carrier wave supplied by the source 2 is constant and at its central frequency. As the amplitude of the carrier wave increases from zero value, the plate current flowing in the triode decreases. At a carrier amplitude that is much lower than a normally useful level the plate current levels off and remains constant until the carrier amplitude is extremely large. The greater the amplitude of the carrier wave, the larger is the negative voltage placed on the grid of the triode as a result of the diode rectification. If this were the only voltage applied to the grid, the plate current in the triode would continue to decrease as the carrier amplitude increased. However, as explained above, the carrier wave voltage appearing between ground and the extremity of the lower portion of the secondary winding 12 is also applied to the grid. This latter voltage tends to cause the plate current of the triode to increase. Because the detection characteristics of the diode and the triode for amplitudes of the carrier wave below an extremely low level are not identical, the diode action tends to reduce the plate current in the triode more than the application of the low level carrier wave to the triode grid tends to increase it. Hence, the plate current of the triode decreases. However, for carrier wave amplitudes that are above a given low value, the detection characteristics of the diode and the triode are nearly identical so that the tendency of the diode to decrease the plate current of the triode is offset by the tendency of the triode to increase its plate current. This results in a substantially constant plate current for a wide range of useful carrier amplitudes.

When the frequency of the carrier wave deviates to one side of its central value, the discriminator transformer operates in a well known manner to apply a larger carrier wave voltage to the diode than to the triode grid. The negative voltage supplied by the diode is, therefore, greater than it was before with the result that the current flowing to the plate 34 of the triode is reduced. The carrier wave of smaller amplitude applied to the triode grid under these conditions also reduces the plate current. When the frequency of the carrier wave deviates in the opposite direction, the negative voltage provided by the diode is less so that the plate current in the triode increases. The carrier wave of larger amplitude that is applied to the grid under these conditions increases the plate current still further. Hence, the effects of the diode rectifier output appearing at the tap 11 and the carrier wave applied to the grid 30 on the triode plate current are cumulative.

It is essential that the resistance of the circuit associated with the grid 30 be sufficiently low to prevent the triode section of the tube 26 from operating as an efficient grid leak detector as such action will oppose instead of aid the action of the diode on the triode plate current.

In the illustrated embodiments of the invention a discriminator transformer performs the function of deriving first and second carrier voltage waves at separate points in the circuit which have amplitudes that vary in opposite senses as the frequency of the carrier deviates about its central value. Other means for performing this function could be used without extending beyond the scope of this invention. It is only necessary that the first carrier wave be rectified by a diode or the equivalent, that the second carrier wave be applied to a power detector and that the output of the diode be applied to the power detector in such manner as to aid the changes in the plate current passing therethrough that are brought about by the second carrier wave.

Matching of the rectification characteristics of the diode and the triode may be obtained by adjusting the values of either or both of the resistors 18, 20. In some applications it may be found that the resistor 18 may be eliminated.

In the embodiment of this invention shown in Figure 2 components corresponding to those shown in Figure 1 are indicated by the same numbers. The cathode 28 is maintained above ground by the insertion of a resistor 46 in the cathode to ground path of the tube 26. Sufficient capacitance, herein indicated as a stray capacitance 48 in shunt with the cathode resistor 46 is to act as a bypass for radio frequency current. If the stray capacitance 48 is not sufficient for this purpose, a condenser may be placed in shunt with the resistor 46. Audio voltage waves that are produced at the center tap 11 by the previously described action of the diode section of the tube 26 appear across a resistor 50 that is connected in series with the tertiary winding 16 between the tap 11 and the cathode 28. If the stray capacitance 52 that shunts the resistor is not of sufficient use to bypass the carrier frequencies, an actual condenser may be used. A coupling condenser 54 and a grid leak resistor 56 serve to apply both the audio voltages appearing at the tap 11 and the carrier wave voltage appearing across the lower portion of the winding 12 to the grid 30 of the triode section of the tube 26. Thus in this arrangement the potential drop across resistor 46 serves to bias the triode to provide suitable power detection characteristics.

Figure 3 illustrates an embodiment of the invention wherein the output of the amplifier 4 is applied to the center tap 11 via a condenser 58 rather than by means of a tertiary winding as in Figures 1 and 2. The cathode 28 is biased above ground by a cathode resistor 60 and shunt condenser 62. Audio voltages are developed across a resistor 64 that is connected between the tap 11 and the cathode 28 by the previously explained action of the diode section of the tube 26. A condenser 66 that is connected between the portion of the secondary 12 that is on either side of the tap 11, and a resistor 68 couple the audio voltages to the upper end of the lower portion of the winding 12. The lower portion of the winding 12 is connected between the condenser 66 and the grid 30 so that the carrier wave voltages appearing between the lower extremity of that portion and ground are superimposed on the audio voltage as required. Actually, the resistor 68 could be connected to the other side of the lower portion of the winding 12 or to an intermediate point thereon. As in Figure 2, the potential across cathode resistance 60 serves as a bias for the triode so that it can perform as a power detector.

In all the circuit arrangements shown, duplex diode triodes that are readily available may be used. The extra diodes may be used for a variety of purposes. For example, one of the diodes could be used as an AM detector so that the entire combination could perform the detecting functions of an AM-FM receiver.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. A detector for frequency modulated waves comprising, in combination, a limiter amplifier, a transformer having primary, secondary and tertiary windings, means for energizing said primary winding with the output of said amplifier, a condenser connected in parallel with said primary winding so as to tune it to parallel resonance at the central frequency of said carrier wave, a condenser connected in parallel with said secondary winding so as to tune it to parallel resonance at the central frequency of said carrier wave, a tube having a diode section comprised of a plate and cathode, and a triode section comprised of a control grid, a plate and said cathode, a connection between one end of said secondary winding and the plate of said diode section, a load circuit having a high impedance for modulation frequencies and a low impedance for carrier frequencies, said load circuit being connected in series with said tertiary winding between a tap on said secondary winding and said cathode, a connection between the other end of said secondary winding and said grid, a source of fixed positive potential, a load impedance connected between said source and said plate of said triode section, and a bypass condenser for carrier wave frequencies connected in parallel with the series combination of said load impedance and said source of fixed potential.

2. A detector for frequency modulated carrier waves and the like comprising, in combination, a transformer having a primary and secondary winding, a condenser connected so as to tune said secondary winding to parallel resonance at the central frequency of the carrier wave, means for coupling the carrier wave voltage variation appearing across said primary winding in the same phase as the carrier wave in the primary winding to a tap on said secondary winding, a rectifier having a plate and a cathode means, a connection between said plate and one end of said secondary winding, a load circuit for said rectifier coupled between said tap and said cathode means, means for maintaining said cathode means at a fixed potential, an amplifier having a cathode means, a control electrode and an output electrode, means for connecting the cathode means of said amplifier in parallel with the cathode means of said rectifier, means for applying operating potentials to said electrodes, and means for coupling the other end of said secondary winding to said control electrode of said amplifier.

References Cited in the file of this patent

UNITED STATES PATENTS

| | | |
|---|---|---|
| 2,097,937 | Rust | Nov. 2, 1937 |
| 2,282,961 | Harris | May 12, 1942 |
| 2,340,429 | Rankin | Feb. 1, 1944 |
| 2,520,419 | Mak | Aug. 29, 1950 |
| 2,561,089 | Anderson | July 17, 1951 |